United States Patent [19]

Totten

[11] Patent Number: 4,765,912
[45] Date of Patent: Aug. 23, 1988

[54] GEOTHERMAL BRINE CLARIFIER PROCESS FOR REMOVING SOLIDS FROM GEOTHERMAL BRINE

[75] Inventor: Clay W. Totten, Indio, Calif.

[73] Assignee: Union Oil Company of California, Los Angeles, Calif.

[21] Appl. No.: 28,233

[22] Filed: Mar. 20, 1987

Related U.S. Application Data

[63] Continuation-in-part of Ser. No. 877,341, Jun. 23, 1986, abandoned.

[51] Int. Cl.$^4$ .............................................. C02F 1/52
[52] U.S. Cl. ................................... 210/713; 60/641.5; 210/715; 210/718; 210/747
[58] Field of Search ............... 210/713, 714, 715, 718, 210/737, 195.3, 747; 60/41.5; 166/267

[56] References Cited

U.S. PATENT DOCUMENTS

| | | | |
|---|---|---|---|
| 2,401,924 | 6/1946 | Goetz | 210/714 |
| 4,302,328 | 11/1981 | Van Note | 210/714 |
| 4,429,535 | 2/1984 | Featherstone | 60/641.5 |
| 4,522,728 | 6/1985 | Gallup et al. | 210/718 |

Primary Examiner—Peter Hruskoci
Attorney, Agent, or Firm—Walter A. Hackler

[57] ABSTRACT

A process is provided for simultaneously clarifying brine in a geothermal facility and producing silica seed material for use within the facility. A clarifier having an agglomeration zone therein is utilized and unclarified geothermal brine comprising silica solids is introduced into the agglomeration zone and thereafter circulated and mixed with the brine being clarified within the agglomeration zone to cause agglomeration of the particles therein. A circulation rate is maintained within the agglomeration zone to enable agglomerated solids therein to settle toward a lower portion of the agglomeration zone to form a sludge blanket, consisting essentially of silica and compounds of naturally occurring elements in the unclarified brine, while enabling clarified brine, having less solids than the unclarified brine, to pass out of the agglomeration zone for collection thereof. The efficiency of the clarifying process is dependent upon the level of the sludge blanket within and around the agglomeration zone and the level of the sludge blanket is controlled by a feedback system for feeding a portion of the sludge blanket into the agglomeration zone. Underflow from the clarifier, when operated in accordance with the present process, directly produces a sludge having a content suitable for direct use as seed material within the flash crystallization stages of the geothermal power plant.

11 Claims, 3 Drawing Sheets

GEOTHERMAL BRINE CLARIFIER PROCESS FOR REMOVING SOLIDS FROM GEOTHERMAL BRINE

RELATED APPLICATION

This application is a continuation-in-part of copending application Ser. No. 877,341, filed on June 23, 1986 now abandoned.

BACKGROUND OF THE INVENTION

The present invention relates generally to the production of electric power using geothermal fluids and, more particularly, to processes used in a geothermal power plant for clarifying geothermal brine to make it suitable for reinjection into the earth and for producing silica seed material, the seed material being useful for enhancing the precipitation of dissolved silica and agglomeration of suspended solids in brine at other stages in the geothermal power plant.

Geothermal brine, having temperatures of over about 500° F., may be withdrawn from large subterranean aquifers which have been found in many areas of the world. The most common occurrence of aquifers having comparatively easy access thereto is where the earth's near-surface thermogradient is significantly high. Manifestation of readily accessible subterranean aquifers is typically the occurrence of volcanic, fumarole or geyser activity.

Brine and steam from naturally occurring geyser activity have been used for many years, both industrially as a heat source, and commercially as in therapeutic baths, and the like. Extraction wells, drilled into the earth's surface to intercept the subterranean aquifers, can bring a steady dependable supply of hot pressurized brine to the earth's surface whereupon steam is flash extracted from the pressurized brine and thereafter utilized to generate electrical power.

While in principal, the extraction of geothermal brine and the eventual generation of electrical power therefrom may be simple, its implementation is not. Unfortunately, geothermal brine is not only usually saline, from which its name is derived, but contains many dissolved minerals and gases. The capacity of the geothermal brine to cause a large amount of contaminants is due to the extreme temperature (over about 500° F.) and pressure (over about 450 p.s.i.g.) at which it is contained within the subterranean aquifers. Examples of the dissolved gases and minerals are hydrogen sulfide, carbon dioxide, ammonia, silica, as well as lead, iron, arsenic and cadmium compounds, to name a few.

It should be readily apparent that the dissolved gases and minerals within the geothermal brine are very corrosive to processing equipment. In addition, during the production of steam from the brine, the pressure is reduced, thus causing many of the dissolved minerals and compounds to precipitate out of the brine and onto any available surface within the processing equipment.

The presence of silica is particularly troublesome in this regard. As hereinbefore noted, high pressurized geothermal brine is typically saturated with silica and when the pressure of the liquid is reduced in order to flash extract steam for power production, the liquid becomes supersaturated with silica. Silica precipitation then occurs from the brine, forming a hard scale within the flash crystallization equipment in addition to downstream piping and equipment. The buildup of scale is significant, with scale formation many times occurring at the rate of several inches per month. Scaling of the piping equipment continues to build until the geothermal brine flow through the system becomes restricted and the entire facility must be shut down for reconditioning. As a result of the hardness of the silica scale and its ability to adhere to the inside surfaces, scraping or cleaning such scale is time-consuming and costly, both in terms of actual cost of removal and in terms of facility downtime during which no electrical output is produced.

To minimize the silica scaling problems in geothermal liquid power producing facilities, two general methods have typically been used. The first method is to prevent the silica from precipitation. The second method is to induce precipitation from the geothermal liquid in a controlled manner and at preferred points within the facility and thereafter removing the precipitated silica and other solids before reinjecting the brine into the earth.

The first of these two methods is very difficult to achieve, while extracting as much usable energy from the hot brines as possible. In other words, while precipitation may be prevented by limiting the amount of pressure reduction during flash extraction of steam, it is apparent that all of the steam available from the brine will not be collected unless the flash temperatures are eventually lowered to atmospheric. Hence, the effort to maintain silica in solution results in inefficient extraction of steam from brine.

The second method of silica control is effected through the seeding of the geothermal aqueous brine with a seed material at appropriate points within the facility. The seed material provides an alternative surface onto which the silica can precipitate. Since the original precipitation, or scale, develops on the seed material, adheres thereto and is thereafter surrounded by brine, its subsequent adhesion to the interior surfaces of the equipment is reduced, if not eliminated, thereby allowing the seeded precipitate to be pumped with the brine for later separation thereof.

Seed material for this process usually is obtained from downstage separation of the precipitate and the process typically includes pumping some of the silica precipitate removed from one downstage portion of the system into the flow of geothermal brine at an upstream point. Usually, the injection of the seed material is within a flash crystallizing stage, which may consist of one or more flash crystallization vessels, each one having a progressively lower operating pressure.

As hereinbefore discussed, providing seed materials in the flash crystallization stage of a geothermal power plant facility can significantly reduce the amount of silica scale on the interior surfaces of the vessels. However, the silica precipitate deposited on the seed material and suspended within the brine includes many other mineral and elemental constituents, including lead and arsenic, which cannot be acceptably discharged into the surrounding environment. Ponding and evaporation of the discharged geothermal effluent is also generally impractical, not only because of the large volumes involved, but because of the toxic materials, generated by exposure to oxygen, therein are also considered unacceptable as land-fill or for most disposal facilities. Consequently, the most feasible manner of disposing of geothermal effluent is by pumping it back into the ground through injection wells.

Injection can safely dispose of dissolved materials and is useful in preventing ground subsidence, which might otherwise be caused by depletion of the subterranean aquifiers from which the geothermal brine is initially removed. However, suspended solids, such as silica precipitate, cannot be easily injected back into the earth.

It must be appreciated that the amount of brine extracted and thereafter injected into the earth can be very high. For example, for a 10 megawatt geothermal brine power plant, the brine flow rate can be about 1.2 million pounds per hour. At these flow rates, even a small amount of suspended solids in the injected brine can cause the injection wells to become plugged and thereafter inoperable or inefficient in disposing of geothermal power plant effluent. Reconditioning of a plugged injection well may cost a million dollars, or more, hence, it is imperative to reduce the amount of suspended solids in the geothermal power plant effluent to as low a level as possible.

Typically, suspended solids in brine removed from a flash crystallization stage in a geothermal power plant facility are removed by a clarifier. The clarifier provides an agglomeration zone for coalescing particles with one another and the removal of enlarged solid particles, for later use as seed material. Clarified brine having fine solid particulates therein is thereafter filtered prior to injection into the earth.

Heretofore, the clarifier in a geothermal power plant installation typically produced an underflow having a suspended solids content of about 15 percent by weight. Thereafter, the underflow was processed in a thickener, or settling tank, in order to produce a brine having 25 to 30 percent, by weight solids, or more, which is suitable for seed material in the crystallization stage of the geothermal power plant.

Clarified brine, or overflow, is withdrawn from the clarifier and flowed through a filtering stage, designed for removing most of the fine suspended particulates from the brine prior to reinjection into the earth. Typically, the filtering stage includes a number of filters, interconnected in a series and/or parallel relationship, which are designed to remove suspended particles in the brine larger than about 5 microns in size. Heretofore, the concentration of such particles in the flocculated clarified brine has been between about 70 and 80 parts per million, and the filtration system designed to reduce the amount of such suspended solids to about 10-20 parts per million. Using the state-of-the-art injection well equipment, concentrations of less than 10 parts per million solids enable the injection of such filtered brine into the earth without excessive scale formation and/or injection well plugging.

It must be appreciated that such filtration systems require continual maintenance as they continually become loaded with the solid particulates they remove from the clarified brine and must either be replaced or backwashed to maintain their operational efficiency. The cost of this maintenance is not insignificant. In fact, for a ten megawatt geothermal power plant facility in which the filtration system is removing 70 parts per million suspended solids from a brine flow rate of about 1.2 million pounds per hour, the maintenance fee for replacing materials, equipment and the process of backwashing and associated power costs for doing so may amount to more than about 1 million dollars annually. In addition to the cost of such service, the filters are not operational during the backwashing and cleaning operation. Consequently, a larger number of filters must be provided in order to provide continuous operation of the power plant. This is an obvious economic disadvantage and, hence, it is desirable to reduce the amount of suspended particles that the filtration system is required to remove in order to prepare effluent brine from the geothermal power plant for injection into the earth.

The present invention is directed to a process for clarifying brine in which the resultant clarified brine has substantially less suspended solids therein than heretofore possible. As can be appreciated from the hereinabove discussion with regard to the cost of filtration of such brine, this results in significant economic advantage in both the reduction of the filtration equipment required and the annual cost of maintaining such filtration equipment in an operational state.

Another advantage of the process of the present invention is the capability of simultaneous production of the seed material for use in the flash crystallizers of a geothermal power plant installation. Hence, the process of the present invention has the advantage of eliminating the process, and apparatus associated therewith, of thickening clarifier underflow in order to prepare it for use in the flash crystallizers as seed material.

Additional advantages and features of the invention will become apparent to those skilled in the art from the following description, when taken in conjunction with the accompanying drawings.

SUMMARY OF THE INVENTION

In accordance with the present invention, a process for clarifying brine for use in a geothermal facility includes introducing unclarified geothermal brine, comprising silica solids into an agglomeration zone containing geothermal brine being clarified and thereafter circulating and mixing the unclarified brine and the brine being clarified within the agglomeration zone, to cause agglomeration of solid particles therein. The circulation rate is maintained within the agglomeration zone to enable agglomerated solids therein to settle toward a lower portion of the agglomeration zone to form a sludge blanket consisting essentially of silica and compounds of naturally occurring elements in the geothermal brine, while enabling clarified brine, having less silica solids than the unclarified brine, to pass out of the agglomeration zone for collection thereof.

The resulting sludge blanket has a higher solids content than the unclarified brine and the circulation rate is sufficient to circulate a portion of the sludge blanket into upper portions of the agglomeration zone to cause agglomeration of solid particles in the brine being clarified. Importantly, a stream consisting essentially of sludge blanket is introduced with the unclarified brine into the agglomeration zone.

More particularly, in the process of the present invention, the amount of sludge blanket circulated within the agglomeration zone is dependent on the level of the sludge blanket in the agglomeration zone. In addition, the amount of the sludge blanket being fed directly into the agglomeration zone with the unclarified brine is used to control the level of the sludge blanket within the agglomeration zone. This feedback of sludge blanket into the agglomeration zone provides for more efficient separation of solids and results in a clarified brine having between about 40 and about 50 parts per million suspended solids therein and the sludge blanket comprises between about 25 to about 30 percent, by weight solids. This separation is best achieved when the unclarified brine being introduced into the clarifier comprises about 4 to about 5 percent, by weight, suspended solids.

Preferably, the process in accordance with the present invention may be used for simultaneously clarifying brine and producing silica seed material for use in geothermal facility. In this instance, a second portion of the sludge blanket is withdrawn from the agglomeration zone for use as silica seed material. Since the process of the present invention provides for efficient separation of the unclarified brine into clarified brine and a sludge blanket, having a high concentration of solids, typically, between about 25 percent and about 35 percent, the sludge blanket may be used directly as seed material without having to further treat the sludge blanket, by gravity settling, or the like, in order to increase the solids content therein to make it suitable for seed material.

The process of the present invention may include the providing of a feedback system for removing a first portion of the sludge blanket and introducing the first portion with unclarified brine in the absence of compounds capable of absorbing or reacting with silica, into the agglomeration zone.

In addition, the present invention provides a process for improving the efficiency of a geothermal brine clarifier having an agglomeration zone therein comprising a reaction well with a draft tube therein. Specifically, the process includes the introduction of unclarified geothermal brine comprising silica solids into the draft tube with the agglomeration zone containing geothermal brine being clarified, and thereafter circulating and mixing the unclarified brine and the brine being clarified within the agglomeration zone to cause agglomeration of solid particles therein.

Thereafter, a circulation rate is maintained within the agglomeration zone to enable the agglomerated solids therein to settle out of the agglomeration zone for forming a sludge blanket, consisting essentially of silica and compounds of naturally occurring elements in the unclarified brine, in the bottom portion of the clarifier, while forcing brine out the top of the draft tube through a reaction well surrounding the draft tube and into a surrounding portion of the clarifier. The sludge blanket has a higher silica solids content than the unclarified geothermal brine and the circulation rate is sufficient to circulate a portion of the sludge blanket into upper portions of the agglomeration zone to cause agglomeration of solids in the brine being clarified with the amount of sludge blanket being circulated depending, in part, on the level of the sludge blanket within the clarifier. A portion of the sludge blanket is withdrawn from the clarifier and a stream consisting essentially of the sludge blanket is fed into the draft tube with the unclarified geothermal brine for controlling the level of the sludge blanket in the clarifier by regulating the amount of sludge blanket portion introduced into the draft tube with the unclarified geothermal brine. Clarified brine is withdrawn from an upper portion of the clarifier surrounding portion.

BRIEF DESCRIPTION OF THE DRAWINGS

The present invention will be more readily understood by reference to the drawings in which.

DESCRIPTION OF THE PREFERRED EMBODIMENT

Figure 1A:
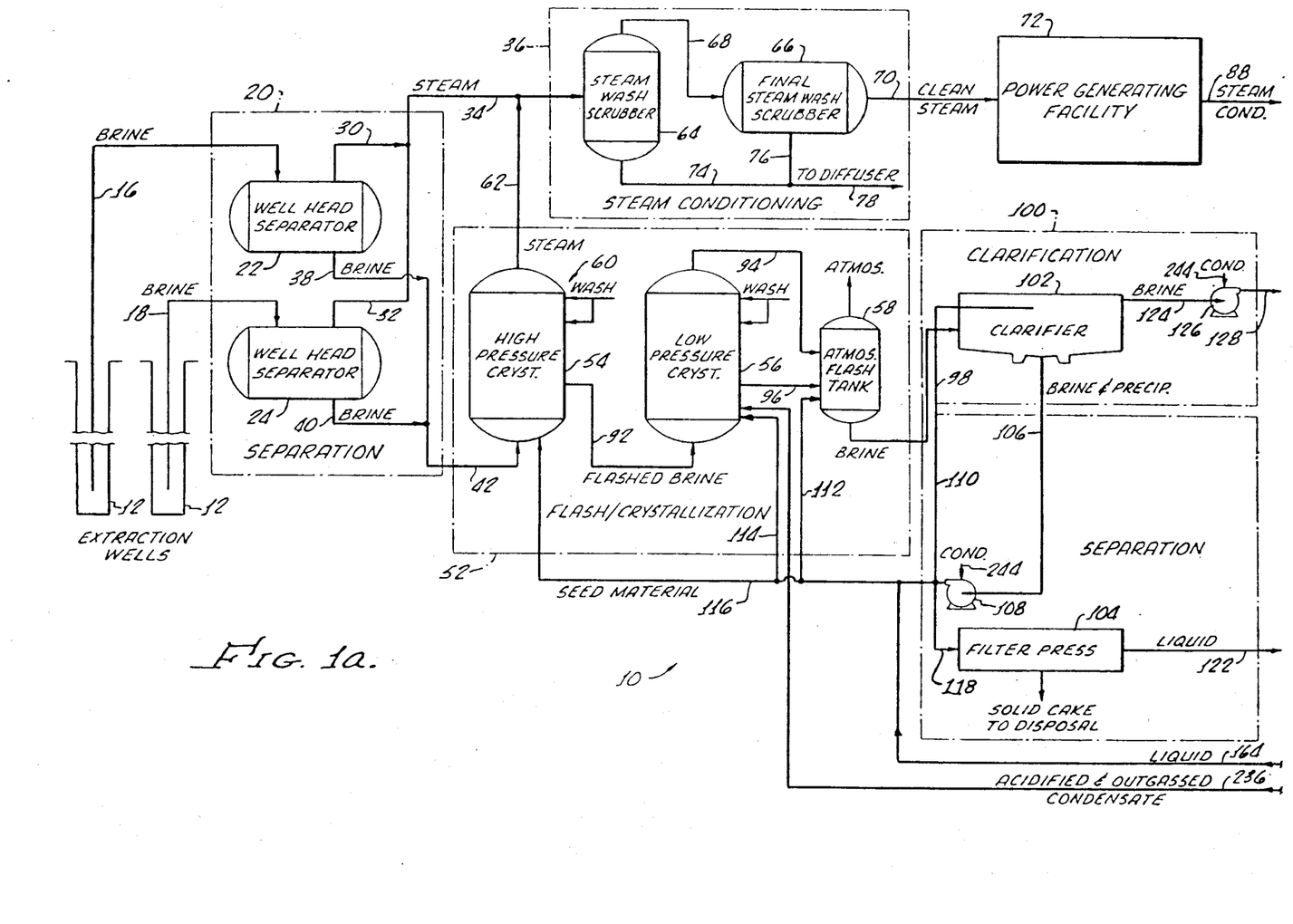
FIGS. 1a and 1b diagram an exemplary hot geothermal brine power generating facility, or system, in which the present process for clarifying brine and producing silica seed material may be used to advantage.
Figure 1C:
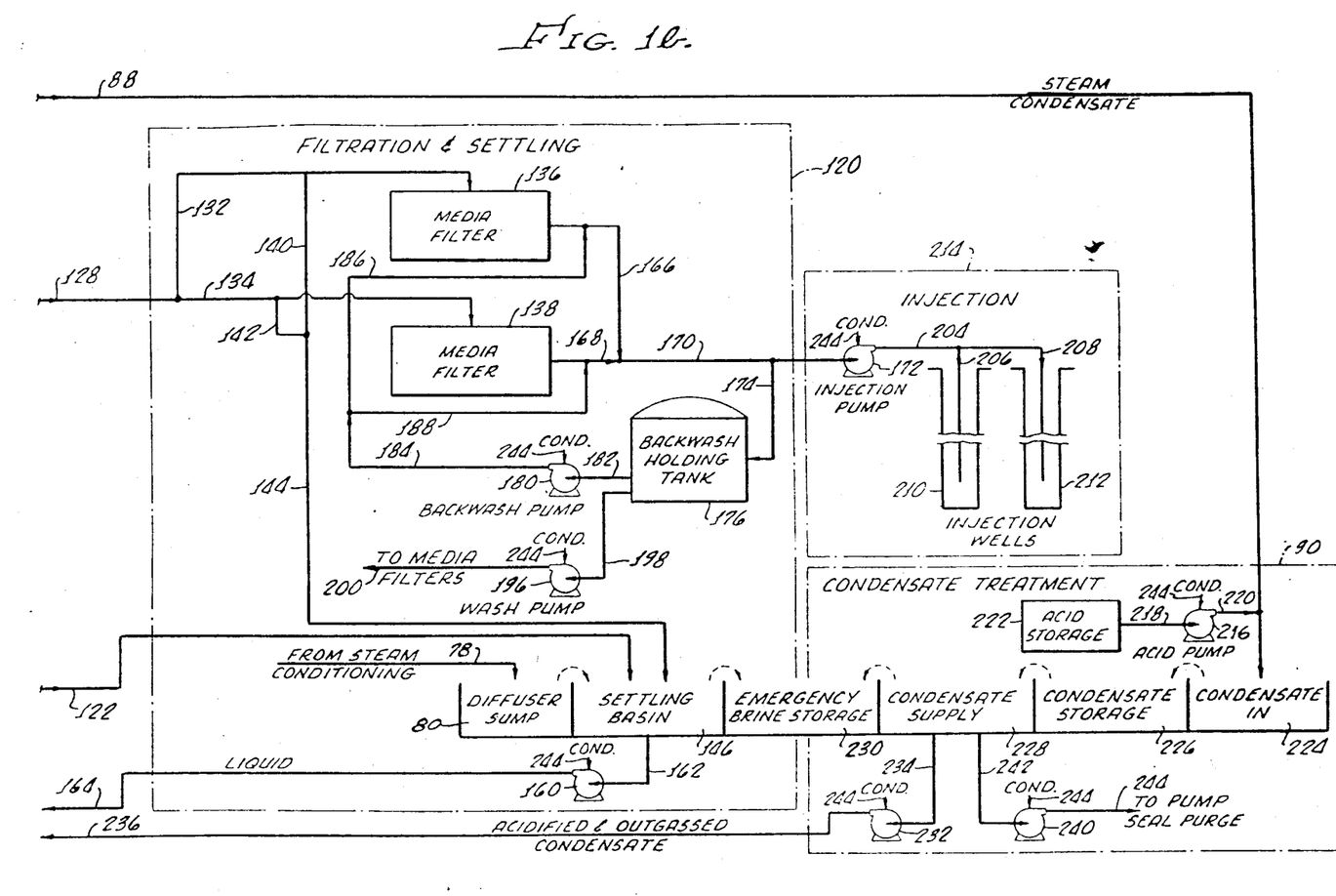

The process of the present invention for clarifying brine and fior producing silica seed material for use in a geothermal facility can be better understood by the consideration of a geothermal brine power plant, suitable for practicing the present invention which is illustrated in FIGS. 1a and 1b in abbreviated block diagrams.

Extraction wells 12 provide hot pressurized geothermal brine to the system 10. It is to be appreciated that while only two wells 12 have been illustrated in FIG. 1a, a larger number of wells may be used to provide the total input brine requirements of the facility 10. The electrical power generating capability of the facility 10 may vary according to the size of the facility; however, in connection with the description herein provided, the parameters of the facility and the flow rates recited refer to a facility having a 10 megawatt power output. For this power output, the facility 10 requires a total brine flow of about 1.2 million pounds per hour of geothermal brine having a well head temperature of about 500° F. and a pressure of about 450 p.s.i.g.

Extracted brine from the wells 12 typically contains rubble, such as sand and rock, which must be separated. The extracted brine is fed through conduits 16 and 18 to a separation stage 20 including wellhead separation vessels 22 and 24. As the sand and rock is removed from the brine in the wellhead separator vessels 22 and 24, some dissolved steam escapes which is collected and fed by conduits 30 and 32 through a common conduit 34 for feeding the collected steam to a steam conditioning stage 36, hereinafter described in greater detail. Brine, free of sand and rock, is discharged from the separators 22, 24 through conduits 38, 40 to a common brine conduit 42 for delivery to a flash crystallization stage 52, the flash crystallization stage 52 supplying the predominant amount of energy producing steam.

Comprising the flash crystallization stage 52 is a high pressure flash crystallizer 54, a low pressure crystallizer 56, and an atmospheric flash tank 58. Brine is introduced into the high pressure flash crystallizer 54 via the conduit 42 where it is subjected to an operating pressure of about 100 p.s.i.g. At this reduced pressure, the brine instantly flashes, or boils, releasing useful steam and producing brine supersaturated with dissolved solids including silica. Before leaving the high pressure crystallizer, the steam generated therein is subjected to a steam washing system 60 to reduce the amount of impurities therein and thereafter fed through a steam conduit 62 for introduction into the steam conditioning stage 36 via conduit 34.

Briefly, the steam conditiong stage 36 includes a steam wash scrubber 64 interconnected with a final steam wash scrubber 66 via conduit 68. Steam passes through the steam wash scrubber 64 and final steam wash scrubber 66 through an exit conduit 70 to a conventional power generating facility 72 for subsequent generation of electrical power. Water from the scrubbers 64, 66 exits via conduits 74, 76 and thereafter passes through a discharge conduit 78 to a diffuser sump 80 (FIG. 1b) for subsequent disposal as hereinafter described. The power generating facility 72 produces about 200,000 pounds of condensate per hour, which corresponds to the extraction rate of about 1.2 million pounds per hour of brine from the extraction wells 12. Discharge of the condensate is through a conduit 88 to a condensate treatment stage 90 hereinbelow described for later reinjection into the earth.

Continuing with a description of the system 10, flashed brine from the high pressure flash crystallizer 54 (FIG. 1a) is fed through a conduit 92, to the low pressure flash crystallizer 56 which may have an operating pressure between atmospheric and about 50 p.s.i.g. At this point, additional steam is flashed from the brine and such steam is fed through a conduit 94 to the atmospheric flash tank 58 at which point it is discharged into the atmosphere. Alternatively, the steam released in the low pressure flash crystallizer 56 may be used for heating or other energy-related purposes within the geothermal power facility 10. Flashed brine from the low pressure crystallizer 56 is fed via a conduit 96 into the atmospheric flash tank 58. Brine, including suspended solids with silica precipitate therein from the atmospheric flash tank 58, is transported through a conduit 98 to a clarification/separation stage 100 which includes a clarifier 102 and a filter press 104.

A significant feature of the process of the present invention is the absence of a typical thickener vessel (not shown) usually included in the clarification/separation stage of a geothermal brine power plant facility. This represents a substantial savings in the operation of the geothermal brine power plant facility 10. For example, in the exemplary embodiment, which is designed for the handling of 1.2 million pounds of geothermal brine per hour, a thickener for treating the underflow of the clarifier 102 would consist of a vessel having a diameter of approximately 26 feet.

The sludge blanket formed in the clarifier 102 is predominately silica with other naturally occurring elements in the geothermal brine. Table 1 shows an analysis of elements in the sludge blanket, said analysis being limited to elements having a Total Threshold Limit Concentration (TTLC). It should also be noted that the moisture analysis shown in Table 1 is for settled sludge. The sludge removed from the clarifier 102 has a solids content of about 25 to about 30 percent, by weight. Because the process of the present invention is conducted without the addition of significant compounds alien to the composition of the geothermal brine, the elements of the sludge shown in Table 1 represent naturally occurring elements in the geothermal brine. It should also be appreciated that while inert material may be added to the clarifier during the operation thereof in accordance with the present invention, such material does not enter into any interaction, such as absorbtion, adsorbtion or chemical reaction with silica or other naturally occurring elements in the geothermal brine. In any event, any material alien to the composition of the geothermal brine is not present to the extent that it comprises more than a small percent, by weight, of the sludge blanket. Such excess material may render the sludge blanket useless as a seed material.

According to the present invention, underflow comprising a sludge blanket, consisting essentially of silica compounds and compounds of naturally occurring elements in the unclarified brine, is fed directly from the clarifier 102 via a conduit 106 by means of a pump 108 directly back into the clarifier 102 via a conduit 110 and/or into the atmospheric flash tank via conduit 112.

TABLE 1

| SLUDGE BLANKET ANALYSIS | | |
| --- | --- | --- |
| SETTLED SLUDGE: | Moisture 18% | |
| | Water soluble 11% | |
| | Water insoluble 71% | |
| WATER INSOLUBLE: | Average particle size (Coulter) 14 um | |
| X-RAY DIFFRACTION: | MAJOR: Barite with minor cation substitution | |
| | TRACE: Fluorite | |
| ELEMENT | ANALYSIS(ppm) | TTLC(ppm) |
| Sb | 240 | 500 |
| As | 123 | 500 |
| Ba | 109,000 | 10,000* |
| Be | 36 | 75 |
| Cd | <10 | 100 |
| Cr | <9 | 500 |
| Ca | <20 | 8,000 |
| Cu | <1,000 | 2,500 |
| F | 13,000 | 18,000 |
| Hg | <0.1 | 20 |
| Mo | <30 | 3,500 |
| Ni | <20 | 2,000 |
| Pb | <1,000 | 1,000 |
| Ag | 117 | 500 |
| V | <9 | 2,400 |
| Zn | <1,000 | 5,000 |
| Al | <1,000 | |
| Fe | 62,000 | |
| Si | 259,000 | |
| Mn | 2,880 | |
| Co | 18,300 | |
| Sr | 6,800 | |
| $CO_3$ | <150 | |
| Cl | 2,510 | |
| Total Solids | 34,000 | |

*Excluding Barite

Alternatively, the sludge blanket may be fed by conduit 114 directly into the low pressure crystallizer 56 and/or into the high pressure crystallizer 54 via a conduit 116. Thus, it is apparent that the present invention can incorporate the flash crystallization stage 52 including the high pressure crystallizer 54, low pressure crystallizer 56 and atmospheric flash tank 58 as well as the conduits 110, 112, 116 as a feedback system for controlling the separation of suspended solids from the brine within the clarifier 102 as hereinafter described in greater detail.

It is important that the feedback of sludge blanket to the clarifier and/or flash crystallization stage be made without the addition of compounds which may absorb or react with silica as may would promote unwanted and/or premature precipitation of silica.

Specifically, regarding feedback of sludge blanket to the clarifier, it is preferred not to use any silica absorbing compounds in order to promote agglomeration of silica because of the cost of such additives in view of the volume of geothermal brine processed. For example, in the exemplary embodiment, it is designed for the handling of 1.2 million pounds of geothermal brine per hour.

As an example, if well known silica absorbing compounds, such as MgO, $Mg(OH)_2$ or $MgCO_3$ are used, the cost would be prohibitive. It can be seen, therefore, that a feature of the present invention is the clarification of flashed geothermal brine without the cost of additives.

Additionally, the underflow from the clarifier provides silica seed material for introduction into the high pressure crystallizer 54 and seed material, as well as particles for agglomeration, for the atmospheric flash tank 58. Eventual disposal of the suspended solids is accomplished by the filter press, fed by a conduit 118, which is utilized to produce a solid cake of solids for disposal and liquid for further treatment in a filtration and settling stage 120, the latter being fed by a conduit 122, interconnecting the filter press 104 with the filtration and settling stage 120.

Clarified geothermal brine is discharged from the clarifier 102 through a brine conduit 124, pump 126, and conduits 128, 132, 134, which discharge into first and second media filters 136, 138. (FIG. 1b). Filter by-pass conduits 140, 142, interconnected, respectively, with the brine conduits 132, 134, enable by-passing of the media filters 136, 138 by a valve system (not shown). A common conduit 144 interconnects the by-pass conduits 140, 142 for discharging brine into a settling basin 146. Additionally, brine from the filter press 104 is fed via the conduit 122 into the settling basin 146. Thereafter, brine is recycled from the settling basin 146 by a pump 160 through conduits 162, 164 back to the atmospheric flash tank 58 through conduit 112 and mixed with underflow from the clarifier 102 before introduction into the atmospheric flash tank 58.

Brine clarified by the media filters 136, 138 is discharged through discharge conduits 166, 168 and 170, and an injection pump 172. A conduit 174 connected between conduit 170 and a backwash holding tank 176 is useful for holding filtered brine to enable back-flushing of the media filters 136, 138. In this process, a pump 180, connected to the holding tank 176 by a conduit 182, enables the pumping of filtered brine, through conduits 184, 186, 188 and through the media discharge conduits 166, 168. During the back-flushing, the flow of brine from the backwash holding tank is forced in a reversed direction through the media filters 136, 138, the control system and valves for effecting the backwash not being shown in the figures. An additional pump 196, connected to the holding tank 176 by a conduit 198, is provided for recirculating, via a conduit 200, filtered brine back through the media filters 136, 138. Filtered brine is pumped by injection pump 172 through conduits 204, 206, 208, into first and second injection wells 210, 212, respectively, which form an injection stage 214 in the system 10.

As hereinbefore mentioned, steam condensate is withdrawn from the power generating facility through conduit 88 to the condensate treatment stage 90. Here an acidifying agent is fed by a pump 216, through conduits 218, 220 from a storage tank 222 into the steam condensate conduit 88 upstream of its discharge into an open receiving tank 224, condensate thereafter moving by overflow from tank 224 into tank 226 and thereafter into a condensate supply tank 228, all of these storage tanks being open to the atmosphere. An emergency overflow tank 230 may be disposed between the settling basin 146 and the condensate supply tank 228. Acid treated condensate is pumped, by a condensate pump 232, through conduits 234, 236, from the condensate supply tank 228 into the low pressure flash crystallizer 56 for combination with the flashed geothermal brine from the high pressure crystallizer 54.

A second condensate pump 240 may be connected, by conduits 242, 244, for pumping a small amount, for example, about 200 pounds per hour, of the treated condensate from the condensate supply tank 228 to purge the seals of the pumps 108, 126, 160, 172, 180, 196, 216, 232 and 240, for cooling the pump seals and for flushing the seal to prevent solid particles, which may be in the pumped brine, from damaging seal-to-pump sealing surfaces. The condensate supplied to each of these pumps eventually passes through the seals and combines with the brine being pumped therethrough.

As hereinbefore pointed out, successful long-term operation of the injection wells 210, 212, is critically dependent upon the amount of solids in the brine reinjected into the injection wells. While many improvements have been made in the successful recovery of useable steam from geothermal brine and handling the brine to provide for equipment and processes for the handling thereof to reduce the downtime of the power plant operation, solids precipitated during the extraction of steam must be removed from the brine before the used brine can be reinjected into the earth. Hence, it is apparent that the reinjection stage is very critical to the expanded commercial use of geothermal brine power plant facilities.

Figure 2:
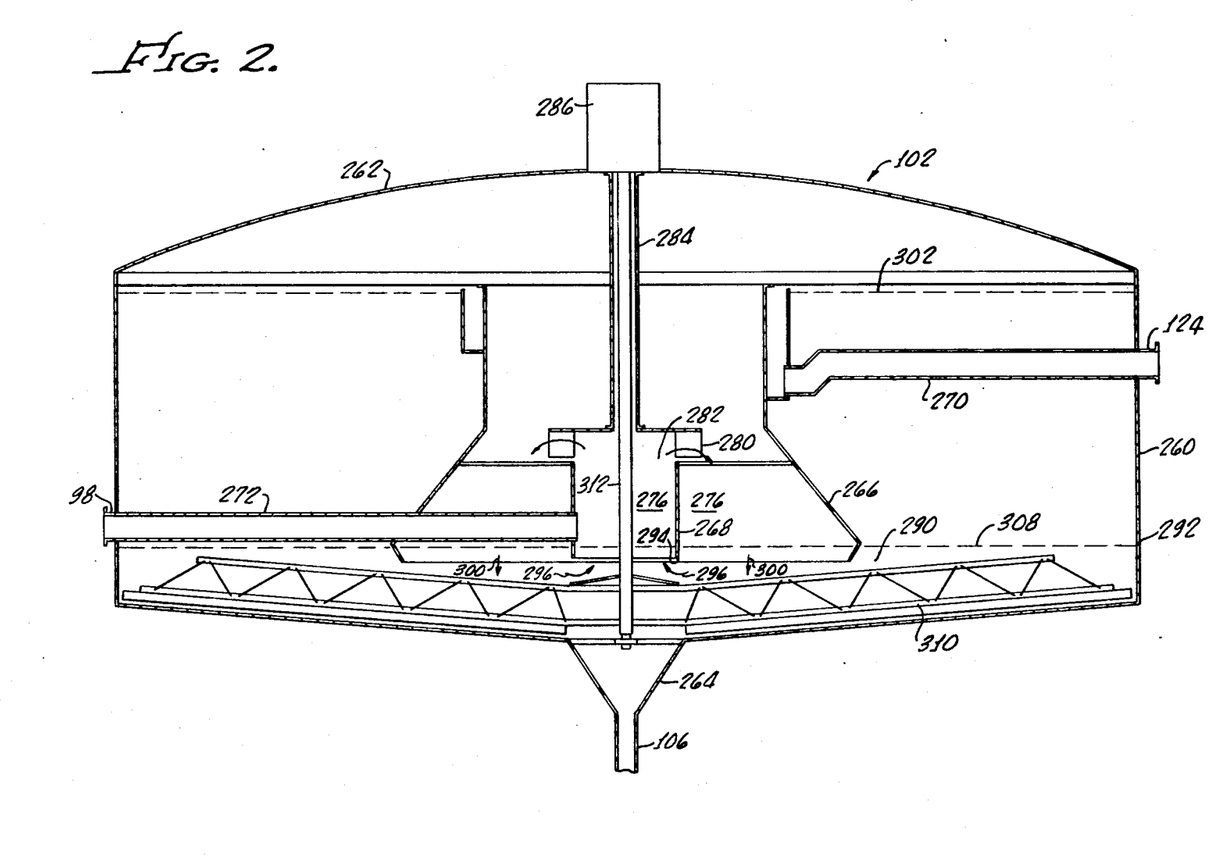
FIG. 2 is a diagrammatic cross section of a clarifier suitable for use in the process of the present invention.

Turning now to FIG. 2, there is shown the clarifier 102 suitable for use in the process of the present invention which may have a diameter of about 60 feet and overall height of about 28 feet when used in the exemplary power plant facility for generating about 10 megawatts of electrical energy and utilizing a brine flow rate of about 1.2 million pounds per hour.

It should be appreciated that any number of clarifiers may be used in parallel and the size may be varied to accommodate the brine clarification requirements or the size of installation in which they are utilized. Materials resistant to the corrosive effects of brine are utilized throughout the clarifier 102 which generally consists of a tank 260, a tank cover 262, a discharge cone 264, as well as a reaction well 266, a draft tube 268, an effluent pipe 270 and an influent pipe 272 interconnected to conduits 122, 98, respectively.

In operation, both the area inside the draft tube 268 and the area inside the reaction well 266 provide an agglomeration zone 276 containing brine being clarified and the influent pipe 272 provides means for introducing unclarified brine comprising solids including silica solids into the agglomeration zone 276. A turbine 280 disposed at a top 282 of the draft tube 268 is driven by a shaft 284 and motor/transmission 286, in order to draw a portion of the sludge blanket 290 disposed in a lower portion 292 of the clarifier 102 into a bottom 294 of the draft tube 268, as indicated by the arrows 296. The circulation rate is maintained within the agglomeration zone 276 to enable agglomerated solids therein to settle toward a lower portion of the agglomeration zone 276, as indicated by the arrows 300, while allowing clarified brine, having less solids than unclarified brine, to pass out of the agglomeration zone for collection thereof. The circulation rate is dependent upon many factors including the size of the clarifier, the density of the solids, the percent weight by solids and the flow rate of unclarified brine into the agglomeration zone. The clarified brine is withdrawn through the effluent pipe 270 disposed just beneath a top 302 of the brine level within the tank 260.

As hereinbefore described, a portion of the sludge blanket 290 is withdrawn and introduced through the influent pipe 272 and the agglomeration zone 276 in order to control the level of the sludge blanket 290, which may have an operational level above or below a nominal operating level 308. To aid the sludge blanket in its motion toward the discharge cone 264, a rake 310 may be provided and revolved at a slow rate via a shaft 312 interconnected to the motor/transmission 286.

In operation, the influent pipe may introduce unclarified brine having about four to five percent suspended solids. The operation of the clarifier, using the feedback system hereinbefore described, enables the unclarified brine to be separated into clarified brine having less than about 50 parts per million silica solids and a sludge blanket discharged through the discharge cone having between about 25 percent and 30 percent by weight solids. This is to be compared with a prior art clarifier operation wherein the clarified brine has between about 100 and about 200 ppm silica solids and the clarifier underflow has a solids content of about 15 percent, by weight. The sludge blanket consisting essentially of silica and compounds of naturally occurring elements in the unclarified geothermal brine.

The high percentage solids in the discharge of the clarifier and the fact that no compounds are present therein which absorb or react with silica enables the discharge to be directly used as a seed material in both the high pressure crystallizer 54, which acts as a crystallization zone, and the atmospheric flash tank 58, which acts as a combined crystallization zone and agglomeration zone. Discharge, including a portion of the sludge blanket 290 from the discharge cone 264, may be passed via conduits 106, pump 108 and conduits 110, 98 directly into the clarifier 102 as a feedback system. Additionally, or alternatively, the sludge blanket may be fed via conduits 106, pump 108, conduit 116 into the high pressure crystallizer 54, (FIG. 1a), as well as into the atmospheric flash tank 58 via conduit 112 and thereafter into the clarifier 102 via conduit 98. This incorporates the high pressure crystallizer 54, low pressure crystallizer 56 and atmospheric flash tank as part of the feedback system utilized in the process of the present invention.

Although there has been described hereinabove a specific process and system for carrying out the process as a preferred embodiment of the present invention, for the purposes of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A process for clarifying geothermal brine in a geothermal facility, said process comprising the steps of:
   (a) introducing unclarified geothermal brine comprising silica solids into an agglomeration zone containing geothermal brine being clarified;
   (b) maintaining a circulation rate within the agglomeration zone to cause agglomeration of solid particles therein and to enable the agglomerated silica solids to settle toward a lower portion of said agglomeration zone to form a sludge blanket comprising at least about 25 percent, by weight, solids consisting essentially of silica and compounds of naturally occurring elements in the unclarified geothermal brine, while enabling clarified brine having less than about 50 parts per million silica solids to pass out of the agglomeration zone for collection thereof, said sludge blanket having a higher solids content than said unclarified brine, said circulation rate being sufficient to circulate a portion of said sludge blanket into upper portions of said agglomeration zone to cause agglomeration of solid particles in the brine being clarified;
   (c) withdrawing the sludge blanket from the agglomeration zone, and
   (d) introducing a stream consisting essentially of sludge blanket withdrawn from the agglomeration zone with the unclarified brine into the agglomeration zone via a conduit external to the agglomeration zone.

2. The process according to claim 1 wherein the amount of sludge blanket being fed into the agglomeration zone with the unclarified brine is used to control the level of the sludge blanket within the agglomeration zone.

3. A process for simultaneously clarifying geothermal brine and producing silica seed material in a geothermal facility, said process consisting essentially of the steps of:
   (a) introducing unclarified geothermal brine comprising silica solids into an agglomeration zone containing geothermal brine being clarified;
   (b) maintaining a circulation rate within the agglomeration zone to cause agglomeration of solids particles therein and to enable agglomerated silica solids therein to settle toward a lower portion of said agglomeration zone to form a sludge blanket comprising at least about 25 percent, by weight, solids consisting essentially of silica and compounds of naturally occurring elements in the unclarified brine, while enabling clarifed brine having less than about 50 parts per million silica solids to pass out of the agglomeration zone for collection thereof, said sludge blanket having a higher silica solids content than said unclarified brine, said circulation rate being sufficient to circulate a portion of said sludge blanket into upper portions of said agglomeration zone to cause agglomeration of solid particles in the brine being clarified;
   (c) withdrawing a first portion of the sludge blanket;
   (d) introducing a stream consisting essentially of said sludge blanket first portion withdrawn from the agglomeration zone and unclarified brine into the agglomeration zone via a conduit external to the agglomeration zone, the amount of said first portion of the sludge blanket fed into the agglomeration zone being used to control the level of the sludge blanket in the agglomeration zone; and,
   (e) withdrawing a second portion of said sludge blanket for use as silica seed material.

4. The process according to claim 3 further comprising the step of withdrawing and disposing of a third portion of said sludge blanket.

5. The process according to claim 1, 2 or 3 wherein the unclarified brine introduced into the agglomeration zone comprises about 4 to about 5 percent, by weight, suspended solids, and the sludge blanket comprises between about 25 percent to about 30 percent by weight solids.

6. A process for simultaneously clarifying geothermal brine and producing silica seed material in a geothermal facility, said process comprising the steps of:
   (a) introducing unclarified geothermal brine comprising solids including silica solids into an agglomeration zone containing brine being clarified, said unclarified brine comprising a relatively large amount of silica solids compared to an amount of silica solids present in the brine being clarified;
   (b) circulating and mixing the unclarified geothermal brine and the brine being clarified within the agglomeration zone to cause agglomeration of solid particles therein;

(c) maintaining a circulation rate within the agglomeration zone to enable agglomerated solids therein to settle toward a lower portion of said agglomeration zone to form a sludge blanket comprising at least about 25 percent, by weight, solids consisting essentially of silica and compounds of naturally occurring elements in the unclarified brine, while enabling clarified brine having less than about 50 parts per million silica solids to pass out of the agglomeration zone for collection thereof, said sludge blanket having a higher silica solids content than said unclarified brine, said circulation rate being sufficient to circulate a portion of said sludge blanket into upper portions of said agglomeration zone to cause agglomeration of solid silica particles in the brine being clarified;

(d) providing an external feedback system for removing a first portion of the sludge blanket and introducing said first portion with said unclarified brine, in the absence of added compounds capable of absorbing or reacting with silica, into the agglomeration zone; and, (e) withdrawing a second portion of said sludge blanket for use as seed material.

7. The process according to claim 6 wherein the added compounds capable of absorbing or reacting with silica comprise magnesium compounds.

8. The process according to claim 7 wherein the magnesium compounds comprise a compound selected from the group consisting of MgO, Mg(OH)$_2$ and MgCO$_3$.

9. A process for improving the efficiency off a geothermal brine clarifier having an agglomeration zone comprising a reaction well with a draft tube therein, said process comprising the steps of:

(a) introducing unclarified geothermal brine comprising silica solids into the draft tube of the clarifier, said draft tube containing brine being clarified;

(b) circulating and mixing the unclarified geothermal brine and the brine being clarified within the draft tube and reaction well to cause agglomeration of solid particles therein;

(c) maintaining a circulation rate within the draft tube and reaction well to enable agglomerated solids therein to settle out of the draft tube to form a sludge blanket comprising at least about 25 percent, by weight, solids consisting essentially of silica and compounds of naturally occurring elements in the unclarified brine, in a bottom portion of the clarifier while forcing brine out of a top of the draft tube through the reaction well surrounding the draft tube and into a surrounding portion of the clarifier, said sludge blanket having a higher silica solids content than said unclarified geothermal brine, said circulation rate being sufficient to circulate a portion of said sludge blanket into upper portions of the draft tube to cause agglomeration of solid particles in the brine being clarified;

(d) withdrawing a portion of the sludge blanket from the clarifier and directly feeding a first portion of the withdrawn sludge blanket into an atmospheric flash tank without increasing the solids content thereof and feeding a second portion of the withdrawn sludge blanket into the clarifier draft tube via an external conduit;

(e) controlling the level of the sludge blanket by regulating the amount of sludge blanket portion introduced to the draft tube via the external conduit; and (f) withdrawing clarified brine having less than about 50 parts per million silica solids from the surrounding portion of the clarifier.

10. A process for improving the efficiency of a geothermal brine clarifier having an agglomeration zone therein comprising a reaction well with a draft tube therein, said process consisting essentially of the steps of:

(a) introducing unclarified geothermal brine comprising silica solids into the draft tube of the clarifier, said draft tube containing brine being clarified;

(b) circulating and mixing the unclarified geothermal brine and the brine being clarified within the draft tube and reaction well to cause agglomeration of solid particles therein;

(c) maintaining a circulation rate within the draft tube and reaction well to enable agglomerated solids therein to settle out of the draft tube to form a sludge blanket comprising at least about 25 percent, by weight, solids consisting essentially of silica and compounds of naturally occurring elements in the unclarified brine, in a bottom portion of the clarifier while forcing brine out of a top of the draft tube through a reaction well surrounding the draft tube and into a surrounding portion of the clarifier, said sludge blanket having a higher solids content than said unclarified brine, said circulation rate being sufficient to circulate a portion of said sludge blanket into upper portions of the draft tube and reaction well to cause agglomeration of solid particles in the brine being clarified;

(d) withdrawing the sludge blanket from the clarifier and directly feeding a first portion of the sludge blanket into an atmospheric flash tank to enable agglomeration of solids therein and feeding a second portion of the sludge blanket into the clarifier draft tube with unclarified via an external conduit brine in the absence of added magnesium compounds;

(e) controlling the level of the sludge blanket in the clarifier by regulating the amount of sludge blanket second portion introduced to the clarifier draft tube; and (f) withdrawing clarified brine having less than about 50 parts per million silica solids from the surrounding portion of the clarifier.

11. The process according to claims 9 or 10, wherein the unclarified brine introduced into the agglomeration zone comprises about 4 to about 5 percent, by weight, silica solids, and the sludge blanket comprises between about 25 percent to about 30 percent, by weight, solids.

* * * * *